United States Patent
Schaefer et al.

(10) Patent No.: US 12,481,484 B2
(45) Date of Patent: Nov. 25, 2025

(54) FIXING USAGES OF DEPRECATED APIs USING LARGE LANGUAGE MODELS

(71) Applicant: Microsoft Technology Licensing, LLC, Redmond, WA (US)

(72) Inventors: Max Schaefer, Kidlington (GB); Sarah Ezzeldin Mostafa Nadi, Edmonton (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 18/384,670

(22) Filed: Oct. 27, 2023

(65) Prior Publication Data
US 2025/0138791 A1     May 1, 2025

(51) Int. Cl.
*G06F 8/36*     (2018.01)
*G06F 8/35*     (2018.01)

(52) U.S. Cl.
CPC . *G06F 8/36* (2013.01); *G06F 8/35* (2013.01)

(58) Field of Classification Search
None
See application file for complete search history.

(56) References Cited

U.S. PATENT DOCUMENTS

| | | | |
|---|---|---|---|
| 9,519,464 B2 * | 12/2016 | Dang | G06F 8/33 |
| 11,163,548 B2 * | 11/2021 | Stylos | G06F 9/54 |
| 2024/0403438 A1 * | 12/2024 | Chan | G06F 11/0793 |
| 2024/0412720 A1 * | 12/2024 | Vasylyev | G06F 16/90332 |
| 2025/0117195 A1 * | 4/2025 | Rieken | G06F 8/33 |
| 2025/0138816 A1 * | 5/2025 | Hutchings | G06F 8/72 |

OTHER PUBLICATIONS

Zan, "Private-Library-Oriented Code Generation with Large Language Models", 2023, Wuhan University (Year: 2023).*
International Search Report and Written Opinion received for PCT Application No. PCT/US2024/049683, (MS#413732-PCT01) Apr. 4, 2025, 16 pages.
Khushboo, et al., "From Bugs to 1-20 Fixes: HDL Bug Identification and Patching using LLMs and RAG", 2024 IEEE LLM Aided Design Workshop (LAD), IEEE, Jun. 28, 2024, pp. 1-5.
Zan, et al., "Private-Library-Oriented Code Generation with Large Language Models", arxiv.org, Cornell University Library, 201 Olin Library Cornell University Ithaca, NY 14853, Jul. 28, 2023, 19 pages.
Zexiong, et al., "Compositional API 1-20 Recommendation for Library-Oriented Code Generation", Proceedings of The 2024 ACM Workshop on Wireless Security and Machine Learning, Acmpub27, New York, Ny, USA, Apr. 15, 2024, pp. 87-98.

* cited by examiner

*Primary Examiner* — Hossain M Morshed
(74) *Attorney, Agent, or Firm* — Workman Nydegger (57) ABSTRACT

Techniques for intelligently prompting an LLM to fix code are disclosed. A corpus of release notes for a set of libraries is accessed. The release notes include information describing deprecated or removed APIs associated with the libraries. The corpus is stored in a vector database. A code snippet is accessed. This snippet is identified as potentially using a deprecated API. The code snippet is used to identify a set of release notes from the vector database. These release notes are determined to satisfy a threshold level of similarity with the code snippet. An LLM prompt is built and is fed to the LLM. The LLM prompt instructs the LLM to update the code snippet based on the identified set of release notes. Output of the LLM is displayed. This output includes a proposed rewritten version of the code snippet.

20 Claims, 11 Drawing Sheets

Figure 1

Release Notes
200

| | Deprecations |
|---|---|
| What's new in 2.0.2 (May 29, 2023) | |
| What's new in 2.0.1 (April 24, 2023) | • Deprecated parsing datetime strings with system-local timezone to [tzlocal], pass a [tz] keyword or explicitly call [tz_localize] instead (GH50771) |
| What's new in 2.0.0 (April 3, 2023) | |
| What's new in 1.5.3 (Jan. 18, 2023) | |
| What's new in 1.5.2 (Nov. 21, 2022) | • Deprecated argument [infer_datetime_format] in [to_datetime()] and [read_csv()], as a strict version of it is now the default. (GH48654) |
| What's new in 1.5.1 (Oct. 19, 2022) | |
| What's new in 1.5.0 (Sept. 19, 2022) | • Deprecated [pandas.io.sql.execute()] (GH50185) |
| What's new in 1.4.4 (Aug. 31, 2022) | |
| What's new in 1.4.3 (June 23, 2022) | |
| What's new in 1.4.2 (April 2, 2022) | |
| What's new in 1.4.1 (Feb. 12, 2022) | |

*Figure 2*

Prompt 300

Given the provided numbered reference information, decide if the provided code needs to be updated.

Focus only on updates that do not change the code's functionality and are related to outdated, deprecated, or non-existent APIs.

1. The full updated code snippet in a fenced code block or an empty fenced code block if you don't want to update the code
2. Reason for update (if any)
3. List of reference numbers used (if any) to update the code. If none of the references below were useful, say 'No references used'

Provided code:
*Example Code*

Original Code:
*Example Code*

Provided reference information:

References:
*Example Reference*
Your response:

Output
500

Possible response:

``` import networkx as nx import numpy as np

G = nx.Graph()

G.add_nodes_from([1, 2, 3, 4, 5])

G.add_edges_from([(1, 2), (1, 3), (2, 3), (2, 4), (3, 4), (3, 5), (4, 5)])

matrix = np.asarray(nx.to_numpy_matrix(G)) # use np.asarray instead of np.matrix print(matrix) ```

Reason for update: The np.matrix class is deprecated and should be replaced by regular ndarrays. See https://numpy.org/doc/stable/reference/generated/ numpy.matrix.html List of reference numbers used: No references used

*Figure 5A*

```
Code Editor
505

File    Edit    View    Git    Project    Build    Debug    Test    Analyze    Tools Program.py
1   DevelopThisProgram
2   {
3       import pandas as pd
4       import numpy as np
5
6       ar2 = np.array(['Q', 'W', 'E', np.nan, 'Q', 'Y'])
7       codes, uniques = pd.factorize(ar2,         510A
8       print(codes)                               510B
9       print(uniques)
10  }              Suggested Code
11                       510
12
...
20
```

```
File   Edit   View   Git   Project   Build   Debug   Test   Analyze   Tools

Program.py
1    DevelopThisProgram
2    {
3        import pandas as pd
4        import numpy as np
5
6        ar2 = np.array(['Q', 'W', 'E', np.nan, 'Q', 'Y'])
7        codes, uniques = pd.factorize(ar2, na_sentinel=77)
8        print(codes)
9        print(uniques)
10   }
11
12
13
14
15
16
17
18
19
20
```

Suggested Code
520

FIXING USAGES OF DEPRECATED APIs USING LARGE LANGUAGE MODELS

BACKGROUND

Modern software development relies on large ecosystems of libraries to perform various operations, such as network communication, mathematical optimization, and so on. Open-source libraries (e.g., pandas in Python) are ubiquitous. These open-source libraries are often supported by a buoyant community of users and contributors. Many of these libraries are also rapidly evolving to add user-requested features, to improve performance, or to support new use cases. Such operations often result in breaking application programming interface (API) changes.

It is also the case that attempting to have existing users update to the latest version can be a challenge. For example, new users often end up using older code versions simply because there is more example code and more tutorials for those older versions than for the latest version. These problems are exacerbated by language-model based developer tools (e.g., GitHub Copilot) whose training corpus is generally heavily biased towards older library versions, meaning that they are likely to suggest code using outdated idioms and deprecated APIs.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for intelligently prompting a large language model (LLM) to generate modified code to fix deprecated code, or rather, code that uses a deprecated application programming interface (API), said method including: accessing a corpus of release notes for a set of libraries, wherein the release notes include information describing deprecated or removed APIs associated with the set of libraries; storing the corpus of release notes in a vector database; accessing a code snippet, which is identified as potentially using the deprecated API; using the code snippet to identify a set of release notes from the vector database, wherein the identified set of release notes is determined to satisfy a threshold level of similarity with the code snippet; building an LLM prompt that will be fed to the LLM, wherein the LLM prompt instructs the LLM to update the code snippet based on the identified set of release notes; and displaying output of the LLM based on the LLM operating in response to the LLM prompt, wherein the output includes a proposed rewritten version of the code snippet.

In some aspects, the techniques described herein relate to a computer system including: a processor system; and a storage system that includes instructions that are executable by the processor system to cause the computer system to: access a corpus of release notes for a set of libraries, wherein the release notes include information describing deprecated or removed application programming interfaces (APIs) associated with the set of libraries; store the corpus of release notes in a vector database; access a code snippet, which is identified as potentially using the deprecated API; use the code snippet to identify a set of release notes from the vector database, wherein the identified set of release notes is determined to satisfy a threshold level of similarity with the code snippet; build a large language model (LLM) prompt that will be fed to the LLM, wherein the LLM prompt instructs the LLM to update the code snippet based on the identified set of release notes; and display output of the LLM based on the LLM operating in response to the LLM prompt, wherein the output includes a proposed rewritten version of the code snippet.

In some aspects, the techniques described herein relate to a method for intelligently prompting a large language model (LLM) to generate modified code to fix code, said method including: accessing a corpus of release notes for a set of libraries, wherein the release notes include information describing deprecated or removed application programming interfaces (APIs) associated with the set of libraries; storing the corpus of release notes in a vector database, which is indexed using embeddings; accessing a code snippet, which is identified as potentially using the deprecated API; using the code snippet to identify a set of release notes from the vector database, wherein the identified set of release notes is determined to satisfy a threshold level of similarity with the code snippet; building an LLM prompt that will be fed to the LLM, wherein the LLM prompt instructs the LLM to update the code snippet based on the identified set of release notes; and displaying output of the LLM based on the LLM operating in response to the LLM prompt, wherein the output includes a proposed rewritten version of the code snippet, and wherein the output further includes a rationale associated with the proposed rewritten version of the code snippet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The disclosed embodiments generally deal with the problem of updating code that uses deprecated third-party library application programming interfaces (APIs). The disclosed embodiments bring about numerous benefits, advantages, and practical applications to the technical field of code management. By way of example, the embodiments improve how code is updated. In doing so, the embodiments help avoid scenarios where code becomes obsolete or otherwise breaks, thereby improving how a computer system functions and operates. By improving the code, the embodiments also improve the user's experience with the computer system.

To achieve these benefits, the embodiments generally rely on the use of language models and on library release notes (aka change notes). It is typically the case that the library release notes contain information about deprecated and removed APIs as well as advice on how to update client code that uses them, for example by switching to other APIs or adjusting how the changed API is used. For example, given a snippet of code that may contain uses of deprecated APIs, the embodiments can feed the snippet, as well as a collection of relevant release notes, to the language model. The embodiments can then prompt the language model to rewrite the code to use the recommended APIs.

By performing the above operations, the embodiments significantly improve how code structures are updated and used. The embodiments also improve how code is maintained and developed. Furthermore, the embodiments are able to prompt developers to improve how they structure their code. Accordingly, these and numerous other benefits will now be described in more detail throughout the remaining sections of this disclosure.

Example Architectures

Figure 1:
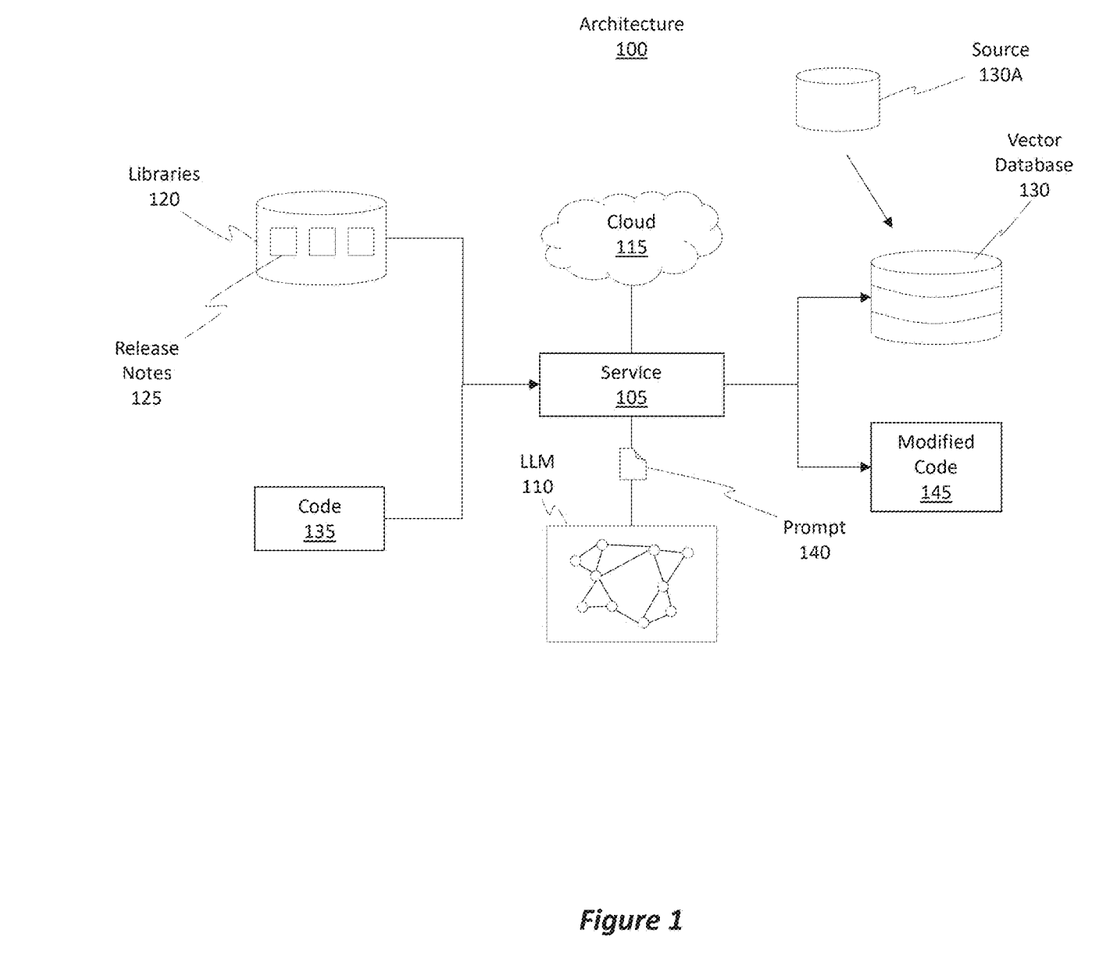
FIG. 1 illustrates an example architecture for using a large language model (LLM) to update code that uses a deprecated API.

Having just described some of the high level benefits provided by the disclosed embodiments, attention will now be directed to FIG. 1, which illustrates an example architecture 100 that can be used to achieve those benefits. Architecture 100 is shown as including a service 105. As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine. The ML engine enables service 105 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Service 105 is shown as including or being associated with a large language model (LLM) 110. LLM 110 can be representative of the machine learning engine or artificial intelligence described above. LLM 110 is a type of neural network that uses various layers of nodes in a probabilistic manner. LLM 110 generates probabilities for words to form various groupings of words in response to prompts. LLM 110 can be a first-party LLM or a third-party LLM.

In some implementations, service 105 is a cloud service operating in a cloud environment 115. In some implementations, service 105 is a local service operating on a local device. In some implementations, service 105 is a hybrid service that includes a cloud component operating in the cloud and a local component operating on a local device. These two components can communicate with one another.

Figure 2:
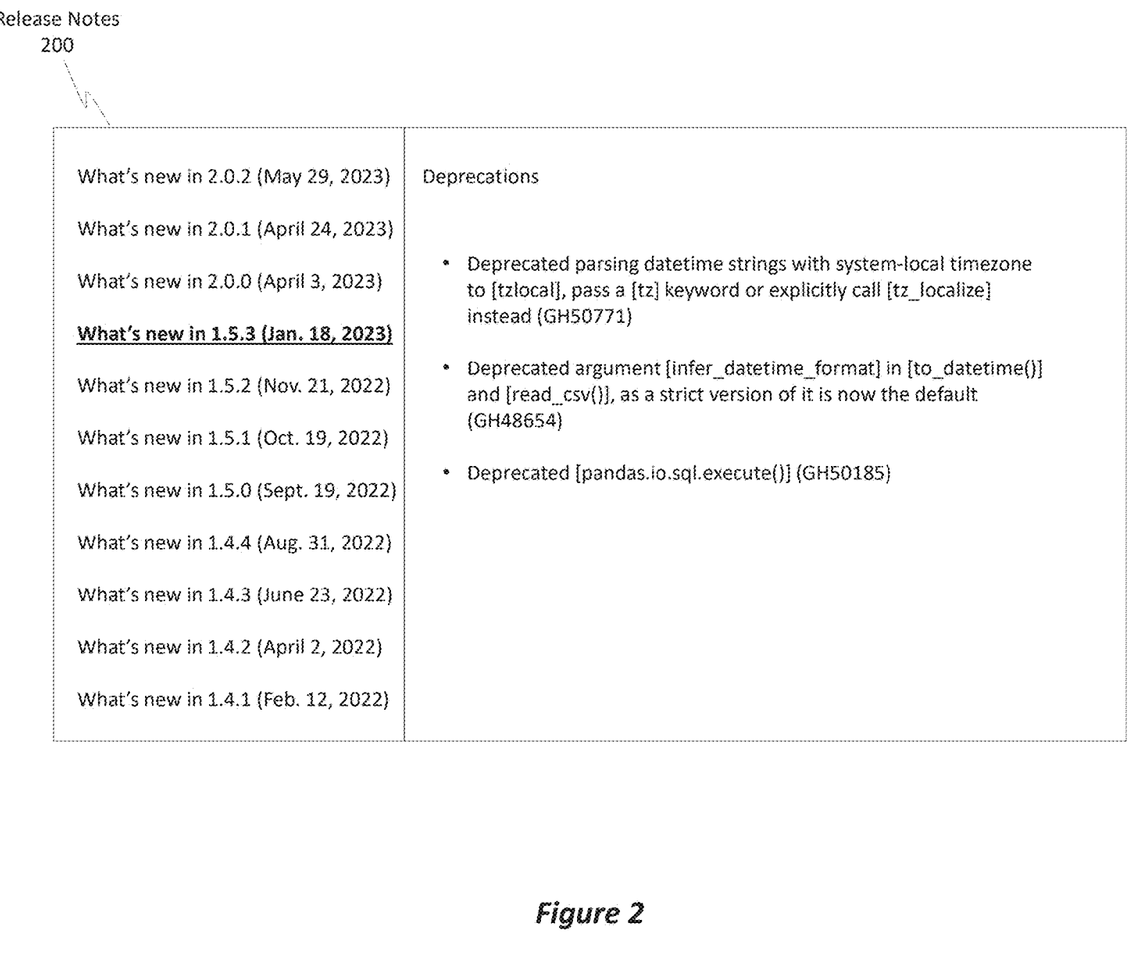
FIG. 2 illustrates an example of release notes (aka change notes).

Service 105 accesses or collects a large corpus of release notes of popular libraries, as shown by the libraries 120 and the release notes 125 in FIG. 1. Turning briefly to FIG. 2, FIG. 2 shows an example set of release notes 200 that are representative of the release notes 125 in FIG. 1. The release notes 200 include information about deprecations and their alternatives or replacements. LLM 110 can be configured in a manner to understand the release notes 200 and to translate them into corresponding code changes. Further details on these operations will be provided shortly.

Returning to FIG. 1, service 105 then parses these release notes 125 and generates embeddings for the parsed data. Different types of embeddings can optionally be used. For example, neural embeddings can be used, TF/IDF embeddings can be used, bag-of-word embeddings can be used, or any other type of embeddings can be used. Service 105 then stores the embeddings in a vector database 130, which can optionally be indexed by the embeddings to enable service 105 to quickly find relevant release notes given a piece of code. In some embodiments, vector database 130 is further extended or supplemented from material obtained by additional sources (e.g., StackOverflow, Reddit, or any other sites), as shown by source 130A. That supplementation process can rely on embedding similarity to find posts relevant to the release notes already on the database. In some cases, the vector database further includes the release notes and any other supporting information or documentation.

Service 105 then accesses a developer's (or more generally a "user's") code, as shown by code 135. Given this code snippet (more generally code 135), service 105 then attempts to find the most relevant release notes from the vector database 130. This search can be performed using the embeddings data mentioned earlier to find release notes that match (at least to a threshold level) the user's code snippet. By way of more detail regarding the code snippet, the LLM often has a fixed context window size, so it is typically the case that the entirety of the codebase is not displayed all at once. Regarding the phrase "context window," LLMs often have a fixed-size buffer that contains both the prompt and the response being constructed. It is this buffer that is being referred to as the "context window." Because it has fixed size, the prompt also has a maximum size, and this in turn means that the whole code base typically cannot be embedded into the prompt and sent to the model in one go; rather, it is typically the case that the embodiments segment the code and send it to the model across multiple prompts.

Consequently, the embodiments can cut the code into snippets and show the LLM one snippet at a time. There are various snippet-creating strategies that are available. When doing so, however, two design decisions are notable, those decisions are: (i) whether the snippet strategy is purely textual or takes code structure into account and (ii) whether the snippets overlap and by how much.

Service 105 then builds a prompt 140 instructing the LLM 110 to update the code 135 as suggested in the included release notes, if necessary. The prompt 140 may be structured to include the relevant embeddings that were found. Prompt 140 may include various code mappings or release note comments detailing how certain old code is mapped to newer code. These prompt line items can help guide the LLM 110 in generating its output.

Figure 3:
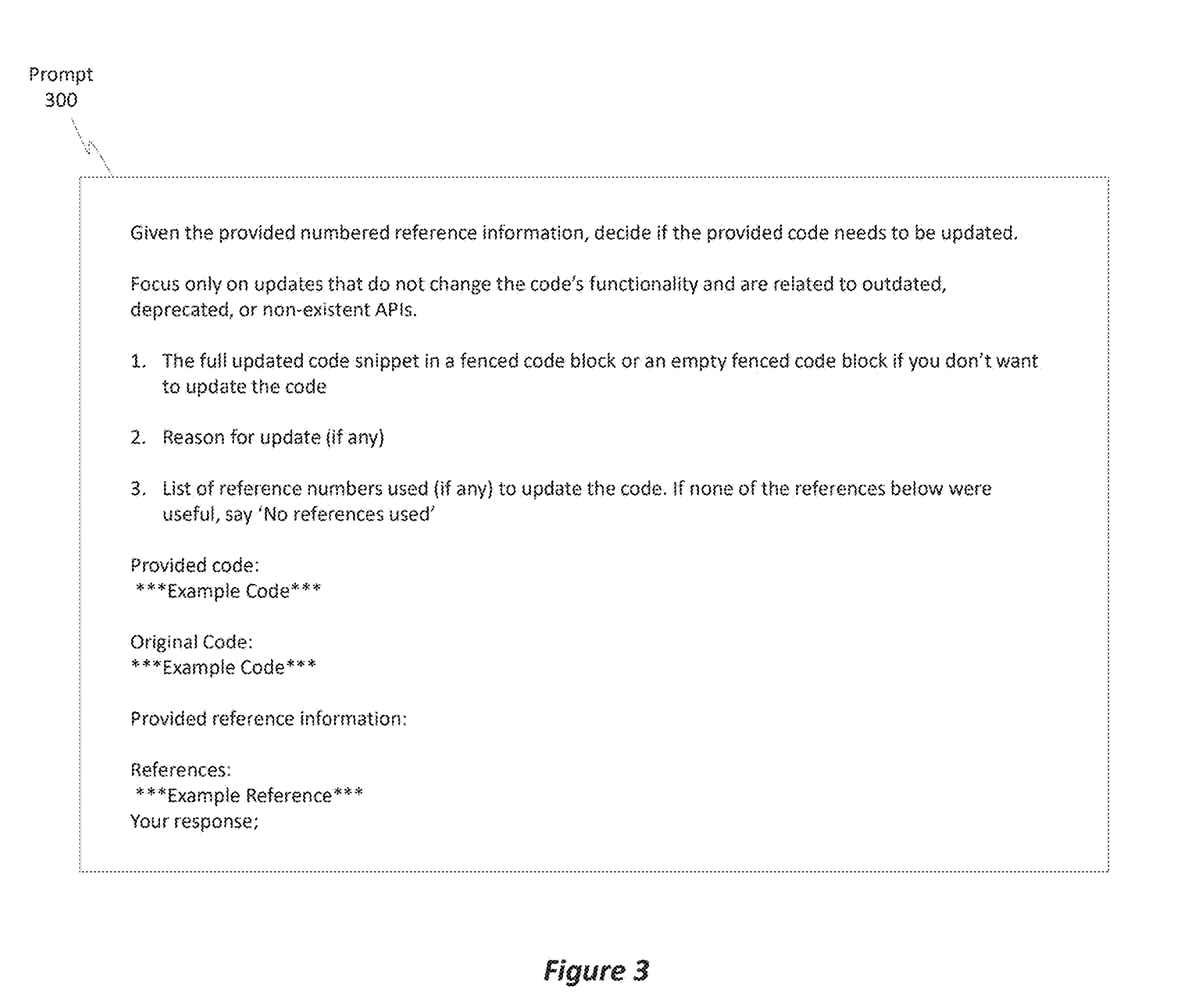
FIG. 3 illustrates an example of an LLM prompt.

FIG. 3 shows an example of a prompt 300 that is representative of prompt 140. One will appreciate how the text used in this prompt is being provided for illustrative purposes only, and the exact language and examples provided herein should not be viewed as being limiting to the disclosed principles.

Prompt 300 includes various text segments. One segment includes the following language: "Given the provided numbered reference information, decide if the provided code needs to be updated." This segment instructs the LLM 110 to determine whether the user's code should be updated.

Another segment includes the following language: "Focus only on updates that do not change the code's functionality and are related to outdated, deprecated, or non-existent APIs." This segment operates to constrain the operations of the LLM 110 to a particular task.

Prompt 300 then includes some additional conditions or constraints. One requirement is the following: "The full updated code snippet in a fenced code block or an empty fenced code block if you don't want to update the code." Another requirement is the following: "Reason for update (if any)." Another requirement is: "List of reference numbers used (if any) to update the code. If none of the references below were useful, say 'No references used'." Many references can be included in the prompt 300. Indeed, it is often the case that many references (e.g., 10, 20, 30, 40, or more than 40) may be included in the prompt 300.

Returning to FIG. 1, in some implementations, service 105 may also task the LLM 110 with providing a justification as to why LLM 110 updated the code 135 the way it did. This request both improves the performance of the LLM 110 (e.g., in the spirit of chain-of-thought prompting and to prevent fabrication) and provides additional information to a human developer. Based on the prompt 140, LLM 110 then generates the modified code 145, which is a modified version of the user's code 135.

In some implementations, service 105 performs a test using the LLM's output. For instance, service 105 may attempt to determine whether the provided response is actual, executable code. This test can optionally be performed by running the output through a test environment to determine whether the code is executable.

Service 105 then presents the rewritten or modified code 145 to the user, optionally in that user's integrated development environment (IDE). Another option is integration with GitHub or Azure DevOps. The service could be run as part of a GitHub Actions workflow or Azure pipeline to look for uses of deprecated code (or code that uses a deprecated API, library, or other deprecated code) in newly written code (for example in a pull request) and suggest updates to that code. Alternatively, the service could be scheduled to run on existing code regularly to find updates to that code. As another option, it could be integrated with a service like Dependabot that identifies client codebases relying on old library versions and suggests updating them.

In some scenarios, the modified code 145 is presented as a replacement for the original code 135. In some scenarios, the modified code 145 is presented as a selectable and suggested update to the original code 135. For example, the modified code 145 can be presented in the form of a quick fix. In some scenarios, the modified code 145 is displayed simultaneously with the code 135 and at a position that is proximate to the code 135. In some cases, the modified code 145 is presented as at least partially overlapping and hiding the code 135.

Optionally, the service 105 can display confidence metrics that the LLM generated. These confidence scores reflect how confident the LLM is that the replacement code is suitable for inclusion into the user's code. In some cases, the confidence score can further reflect whether the replacement code has been tested and verified that it will work.

Figure 4A:
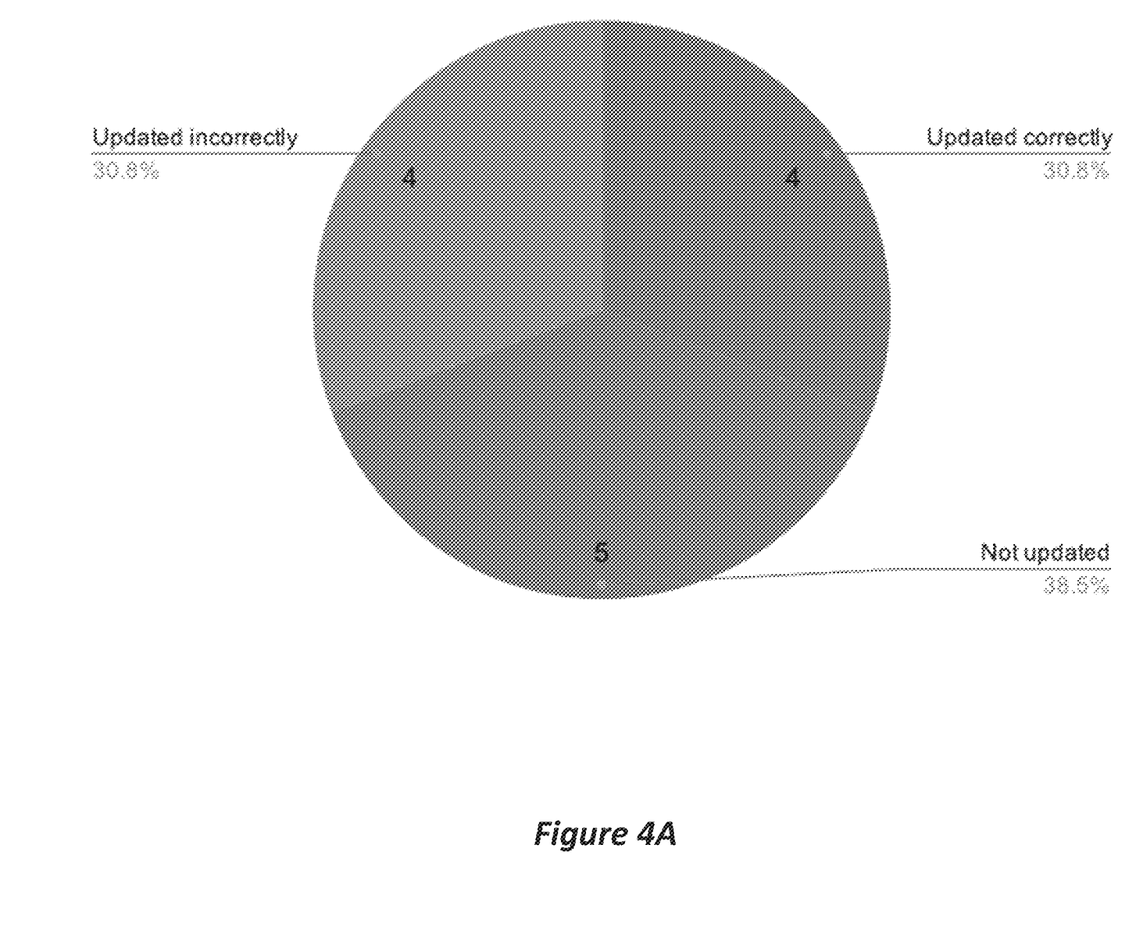
FIGS. 4A and 4B illustrate output metrics of the disclosed embodiments.

FIGS. 4A and 4B illustrate some experimental results based on practicing the disclosed principles. FIG. 4A shows a success rate of an LLM without release note references 400. This LLM updated the code incorrectly 30.8% of the time. The LLM updated the code correctly 30.8%, and the LLM did no updates 38.5%.

Figure 4B:
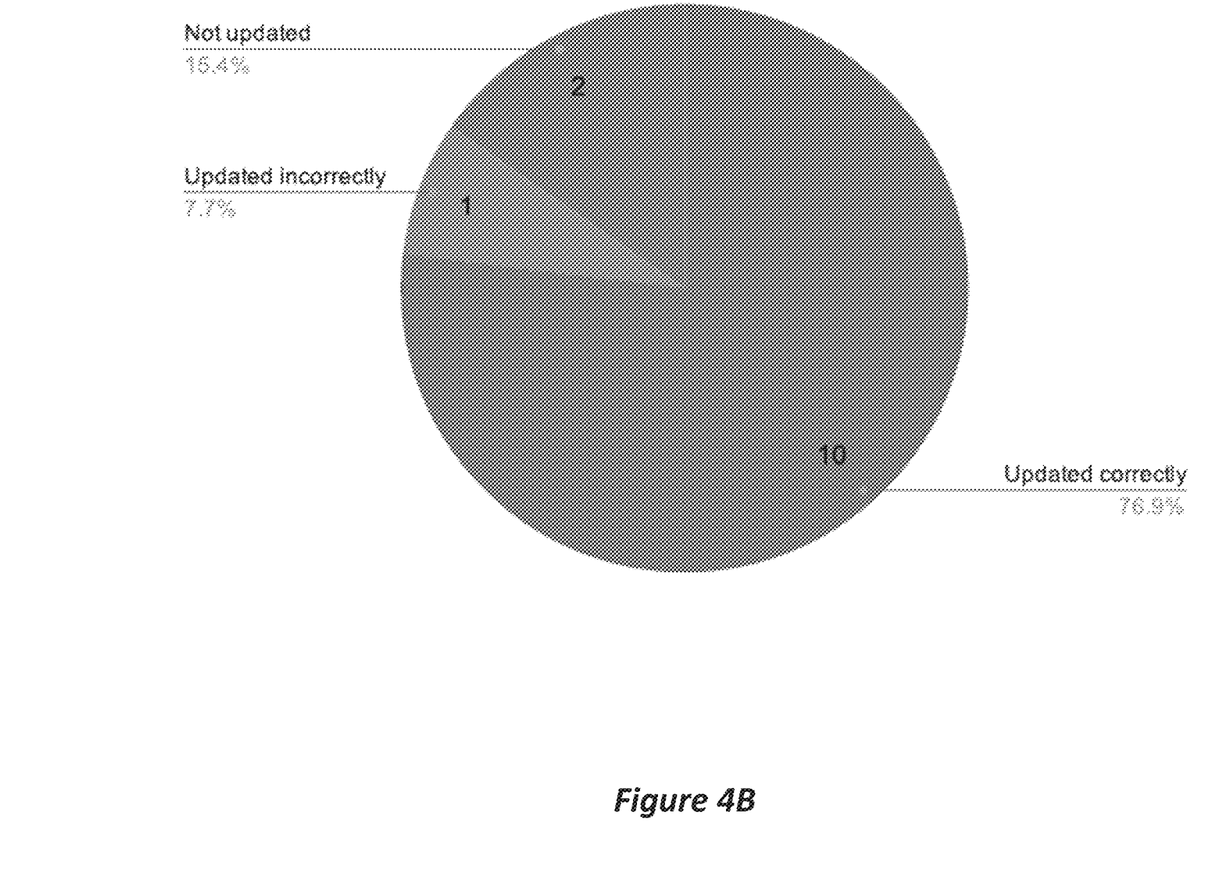

In contrast, FIG. 4B shows the success rate of an LLM with release note references 405. This LLM updated incorrectly 7.5% of the time, made no updates 15.4% of the time, and updated correctly 76.9% of the time. The results shown in FIG. 4B illustrate how, when the embodiments engineer a prompt in the manner disclosed herein, significant performance results can be achieved because of the "grounding" effect of the engineered prompt.

In some embodiments, service 105 may include the initial output of the LLM in a feedback prompt that is subsequently fed back into the LLM. This feedback prompt may be designed to try to improve the results of the LLM. For instance, if the LLM updated incorrectly, as reflected above, the embodiments may trigger the generation of the feedback prompt with additional details in that prompt to inform the LLM how its last output was not sufficient. Any number of iterations may be performed in an attempt to correctly update the user's code.

Figure 5A:
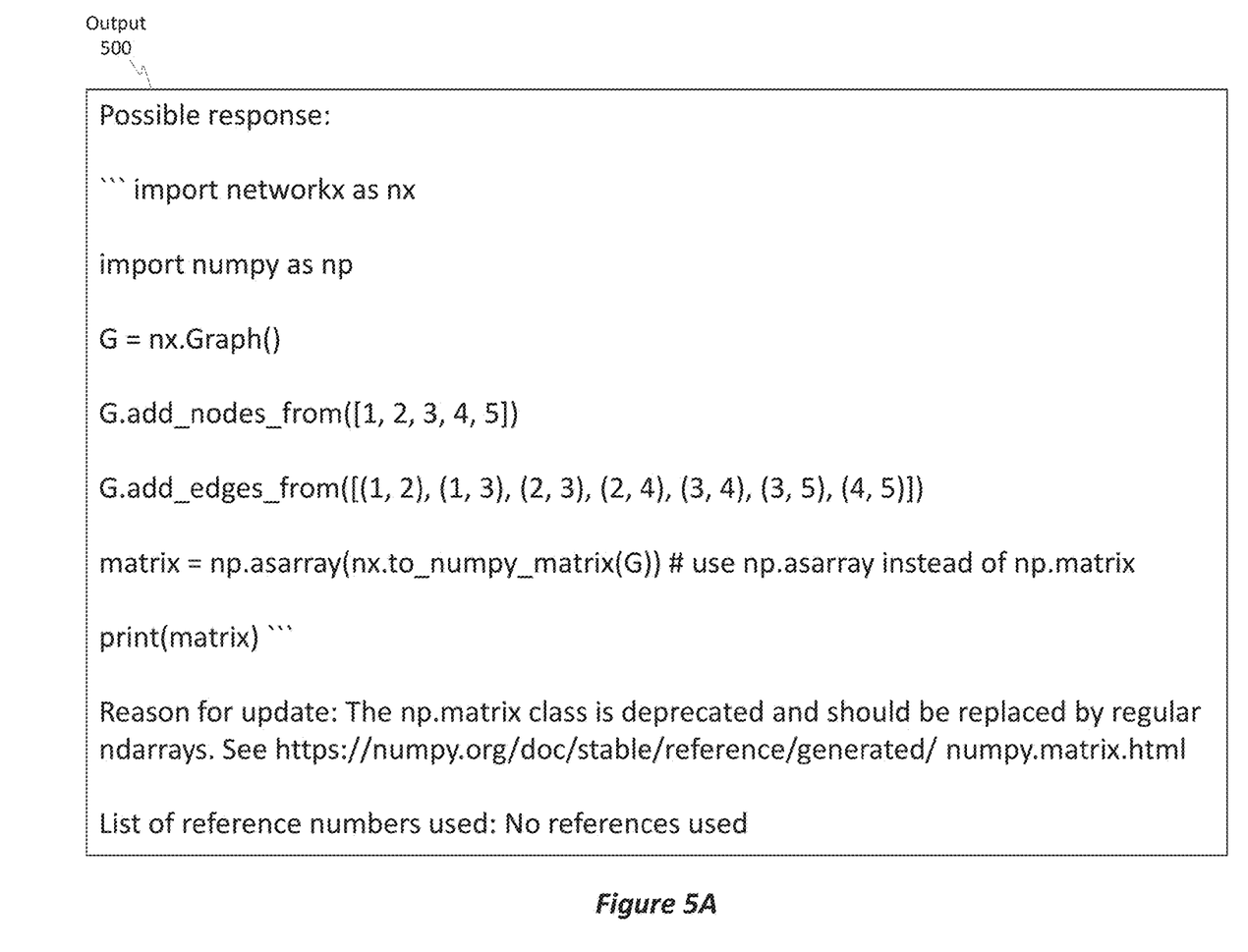
FIGS. 5A, 5B, 5C, and 5D illustrate various examples of output generated by the LLM.
Figure 5B:
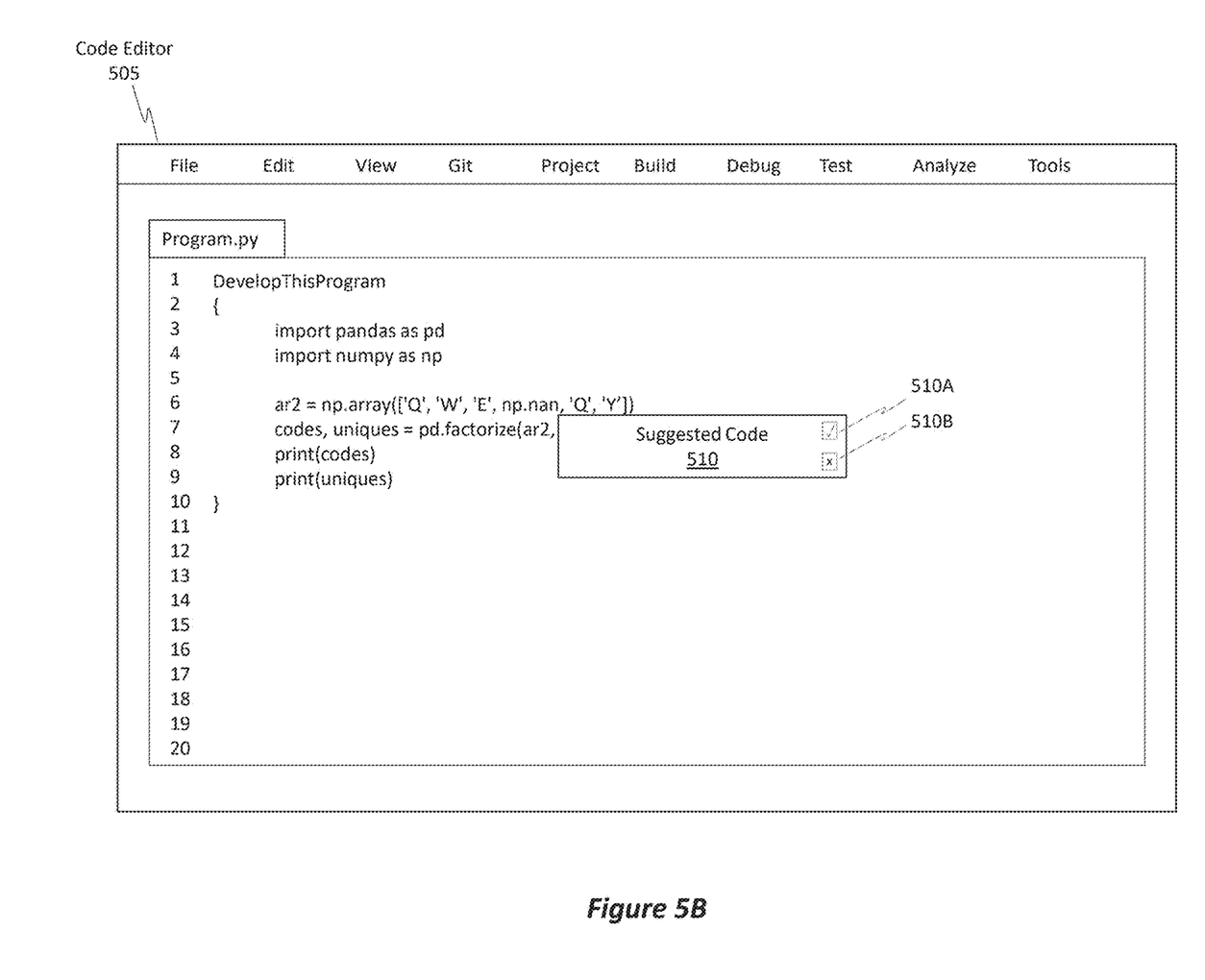

FIG. 5A shows an example of the output 500 that can be generated by the LLM 110 of FIG. 1. Notice, the output 500 includes various changes as well as a reason for why the LLM 110 is recommending these changes. FIG. 5B shows a code editor 505, such as an integrated development environment (IDE). The modified code output generated by the LLM can be displayed within the window of the code editor 505. For example, the code in line 7 includes the following argument "na_sentinel=77." In this scenario, the "na_sentinel" argument in the "pd.factorize( )" function has been deprecated. Instead, it is desirable to use the "use_na_sentinel" argument and to set its value to "True" to encode NaN values with the sentinel−1. Thus, the LLM can generate the modified code and display it as the suggested code 510.

For example, FIG. 5B shows a scenario where the LLM's output (i.e. in the form of the suggested code 510) is displayed at a position that entirely overlaps the code that is being operated on by the LLM. Optionally, a selectable option can be displayed to accept the LLM's suggestion. For example, the selectable option 510A is an option to accept the suggested code 510, resulting in that code being automatically incorporated or adopted into the codebase. For instance, if the user accepts the suggestion, the service 105 can automatically incorporate that new code into the codebase, thereby replacing the previous code. Alternatively, selectable option 510B is an option to reject the suggested code 510, resulting in that code not being implemented into the codebase. In some implementations, the user can provide feedback as to why that suggestion is not being used. This feedback may later be used by the service when building subsequent prompts, and the feedback may improve the operations of the LLM.

Figure 5C:
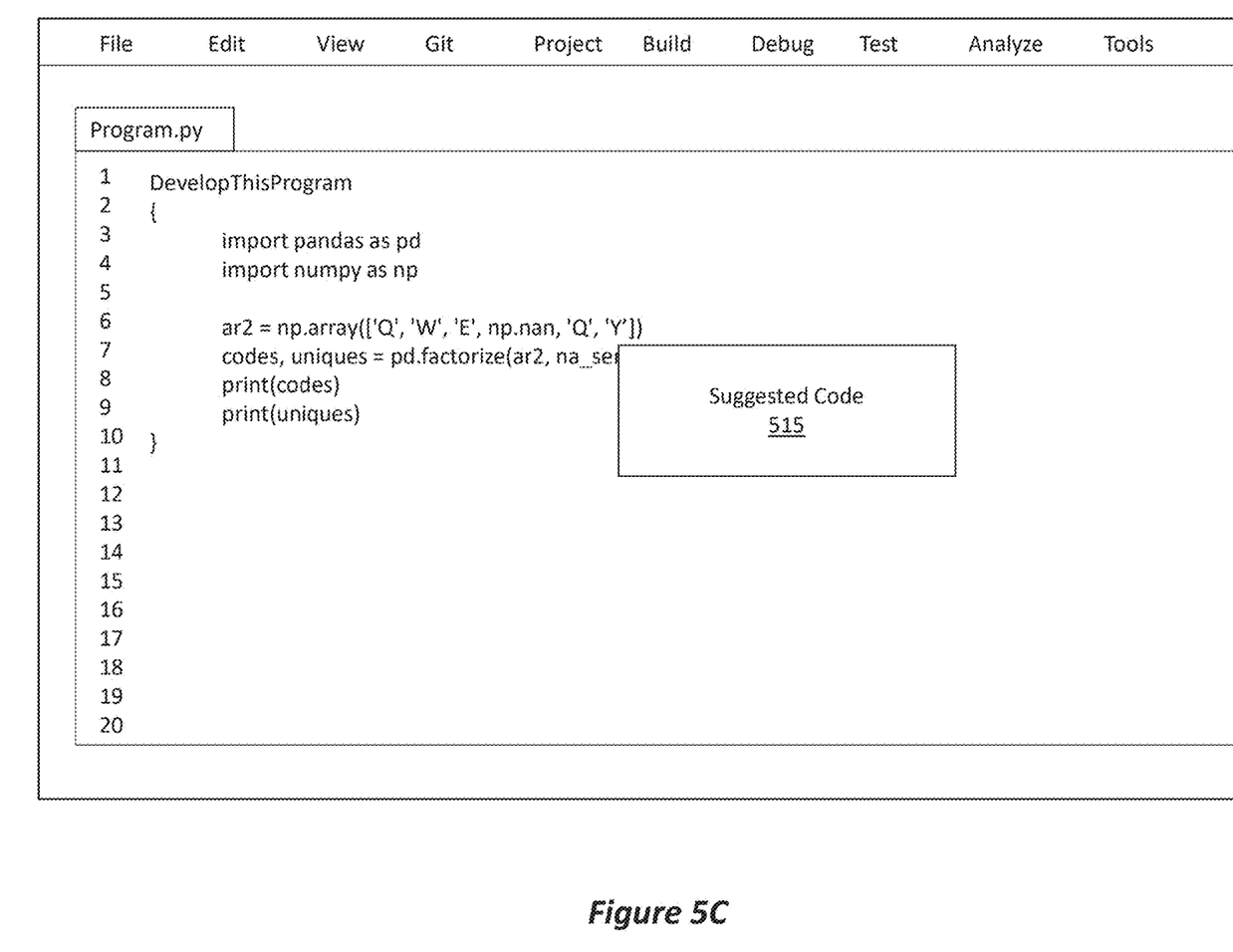
Figure 5D:
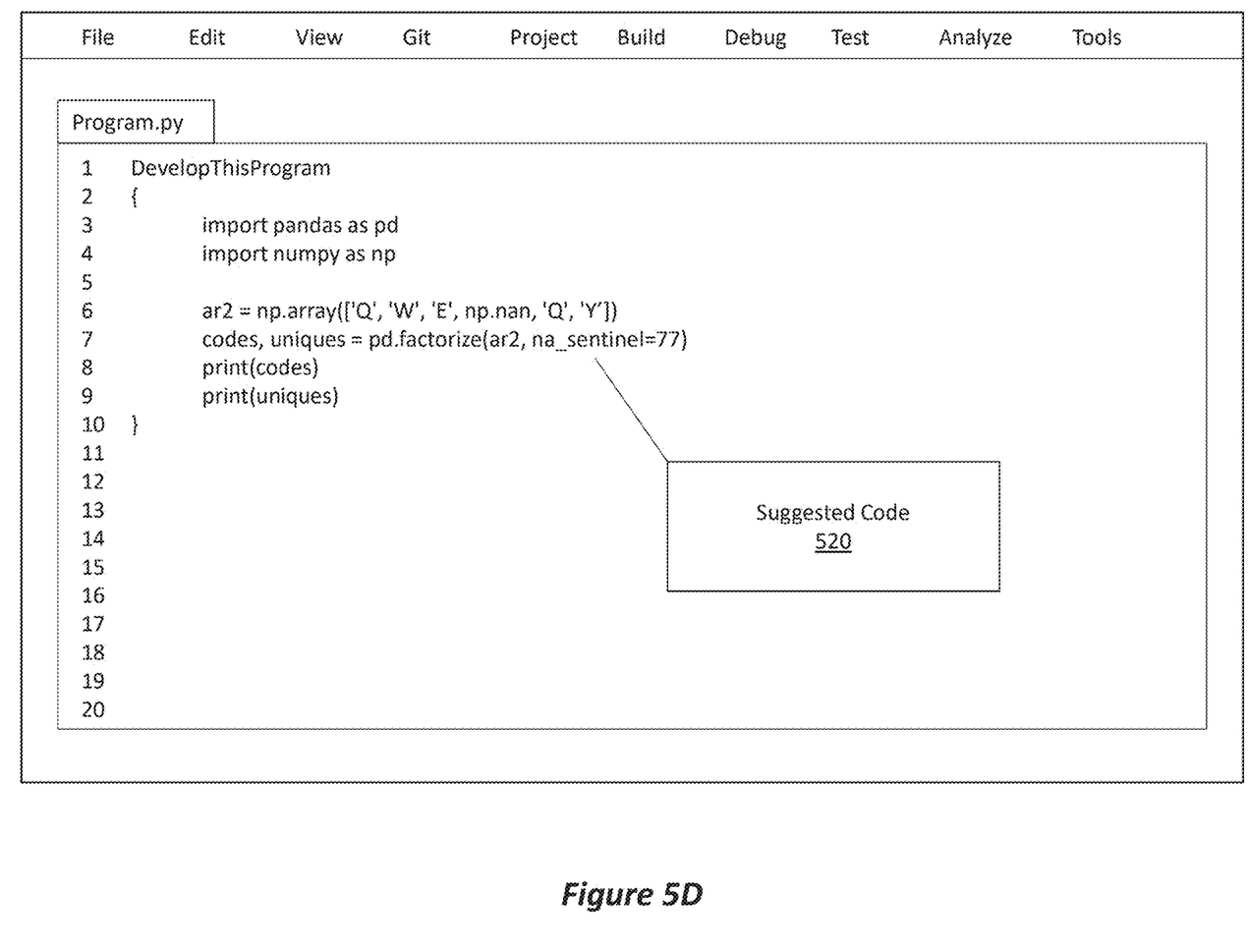

FIG. 5C shows an example scenario in which the suggested code 515 is only partially displayed overtop of code that was acted on by the LLM. FIG. 5D shows an example scenario in which the suggested code 520 is displayed proximately to the code that was acted on by the LLM, but the suggested code 520 is not displayed over top of that code. In some cases, a guideline can be used to link or associate the suggested code 520 with the underlying code.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
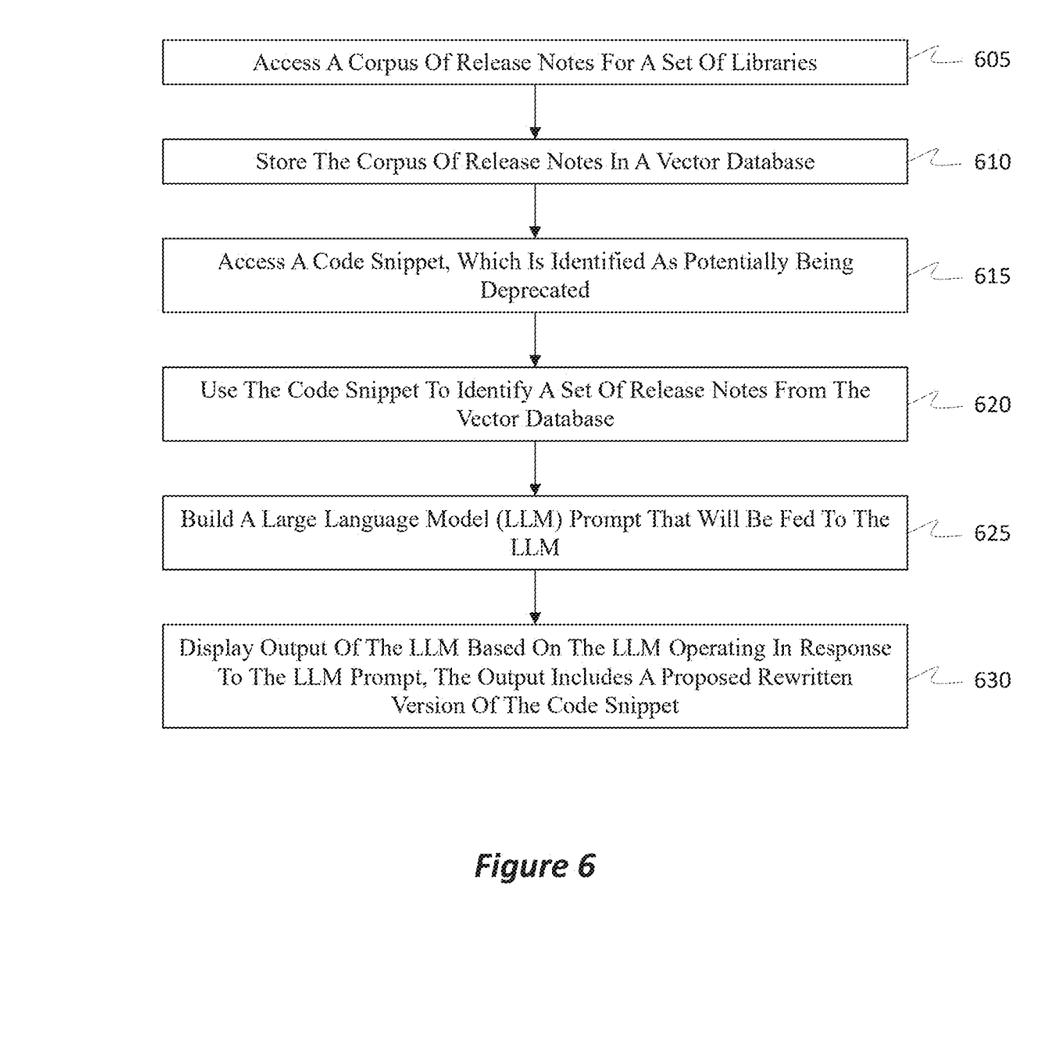
FIG. 6 illustrates a flowchart of an example method for using an LLM to update code.

Attention will now be directed to FIG. 6, which illustrates a flowchart of an example method 600 for intelligently prompting a large language model (LLM) to generate modified code to fix code that uses a deprecated API. Method 600 can be implemented within the architecture 100 of FIG. 1; furthermore, method 600 can be performed by the service 105. Typically, the LLM is a generative pre-trained transformer type of LLM. The LLM can be hosted by a first party or a third party.

Method 600 includes an act (act 605) of accessing a corpus of release notes (e.g., release notes 125 from FIG. 1) for a set of libraries (e.g., libraries 120). The release notes include information describing deprecated or removed application programming interfaces (APIs) associated with the set of libraries.

Act 610 includes storing the corpus of release notes in a vector database, such as the vector database 130. Optionally, the vector database can be indexed using embeddings, and the embeddings can also be included in the vector database. In some embodiments, the vector database further includes information obtained from one or more external sources. For example, the one or more external sources may include an online forum comprising information describing the release notes. In this regard, the vector database can be further supplemented with information obtained from sources other than release notes. The disclosed service is able to crawl public networks in an attempt to identify conversations, information, or other code that may be relevant to the current task.

Act 615 includes accessing a code snippet (e.g., code 135). This code snippet is identified as potentially using the deprecated API. Often, this code snippet is included in a codebase that is being developed by a user or developer. As discussed previously, it is sometimes the case that developers use deprecated code in their codebases. When APIs update, however, that deprecated code may cause the developer's codebase to break. As a result, it is desirable to update the code snippet to reflect up-to-date code. The embodiments may determine that the code is deprecated by performing an initial query against the vector database to determine whether information in that vector database corresponds to the code snippet. Any triggering action to determine whether code is deprecated can be used, including relying on trigger points, suggestions, or even copy and paste operations. Also, any process of determining that code is deprecated can be used. The above query technique is but one example. If the vector database includes release notes or other information that is related to the code snippet, then the likelihood that the code snippet is obsolete or deprecated is higher.

Act 620 includes using the code snippet to identify a set of release notes from the vector database. The identified set of release notes is determined to satisfy a threshold level of similarity with the code snippet. In some implementations, the threshold level of similarity is based on a comparison of embeddings, such as those included in the vector database. For instance, embeddings may be generated for the code snippet, and those embeddings may be compared against the embeddings in the vector database.

The identified set of release notes may include a code mapping detailing how to map an older version of code to a current, up-to-date version of code. Optionally, the identified set of release notes may include natural language detailing how an older version of code is transformable to a current, up-to-date version of code. Optionally, the identified set of release notes may include a combination of natural language and code. As another option, the identified set of release notes may include other information on how to update an older version of code to a current, up-to-date version of code.

In some scenarios, these release notes may be the direct match for the code that is being used by the developer, such as a complete match between their embeddings. In other scenarios, these release notes may be related but may not be a direct or complete match. In other scenarios, these release notes may simply operate as examples and may not have a close match to the developer's code. The embodiments attempt to identify whichever release notes may be best attributed or matched with the developer's code. Even if a complete match is not found, example release notes can be used to help guide the LLM in updating code.

Act 625 then includes building an LLM prompt that will be fed to the LLM. The LLM prompt instructs the LLM to update the code snippet based on the identified set of release notes. In some cases, the LLM prompt includes at least one of an example code mapping, a release note comment, or an instruction for the LLM to provide a rationale regarding its output.

These updates can include modifying the code language to conform with the up-to-date version of the code. It may be the case that specific statements, such as call statements or other declarations, have changed as the APIs were updated. The embodiments rely on the LLM to learn these changes and to then apply those changes to the developer's own code so that the developer's code can be updated. The LLM is generally tasked with reading the identified set of release notes and with translating the identified set of release notes into corresponding code changes.

Act 630 then includes displaying output of the LLM based on the LLM operating in response to the LLM prompt. The output includes a proposed rewritten version of the code snippet. The output may further include one or more selectable options to accept or reject the output. The proposed rewritten version of the code snippet can also be automatically incorporated into a codebase such that the proposed rewritten version of the code snippet replaces the code snippet in the codebase. In some implementations, the output is displayed proximately to the code snippet. In some cases, the output further includes a rationale associated with the proposed rewritten version of the code snippet.

In some cases, the output generated by the LLM is provided in a feedback prompt, which is subsequently fed back into the LLM in an attempt to improve the LLM's output through multiple iterations of execution. In some implementations, the LLM can also be tasked with providing a confidence metric to inform the user how confident the LLM is with regard to its output.

Accordingly, the disclosed embodiments are able to intelligently and automatically update a user's codebase in response to a determination that the user's codebase may potentially include deprecated code or potentially use a deprecated API. In performing these operations, the embodiments improve a computer system's functionality and help improve code.

Example Computer/Computer Systems

Figure 7:
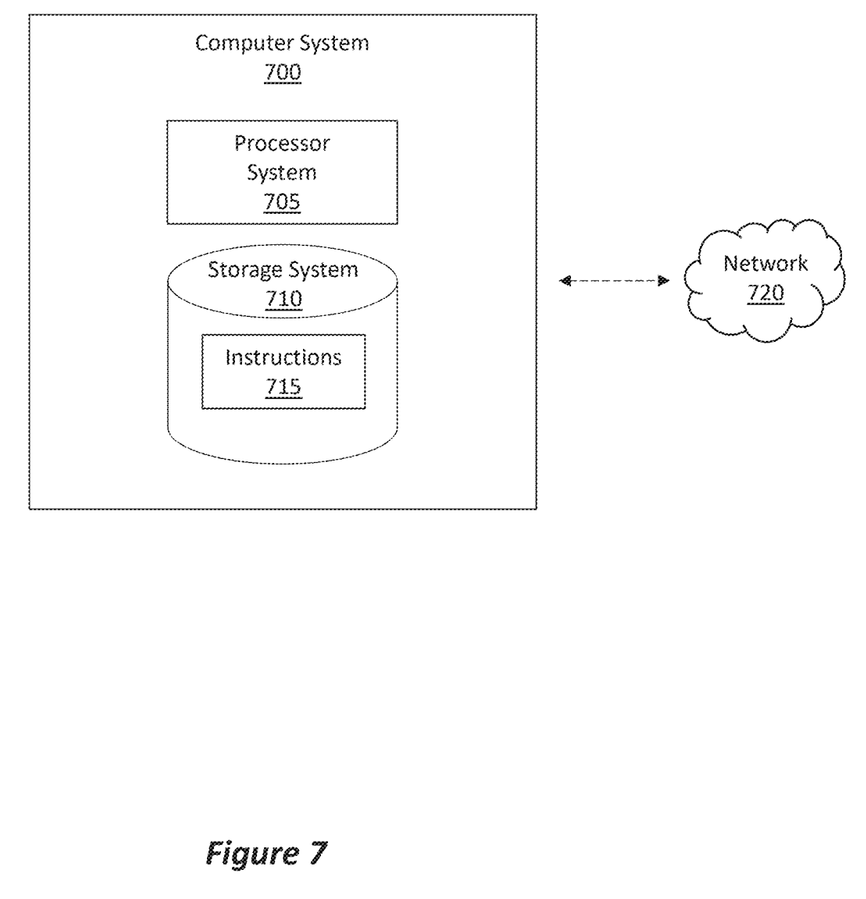
FIG. 7 illustrates an example computer system that can be configured to perform any of the disclosed operations.

Attention will now be directed to FIG. 7 which illustrates an example computer system 700 that may include and/or be used to perform any of the operations described herein. Computer system 700 may take various different forms. For example, computer system 700 may be embodied as a tablet, a desktop, a laptop, a mobile device, or a standalone device, such as those described throughout this disclosure. Computer system 700 may also be a distributed system that includes one or more connected computing components/devices that are in communication with computer system 700. Computer system 700 can implement the service 105 of FIG. 1.

In its most basic configuration, computer system 700 includes various different components. FIG. 7 shows that computer system 700 includes a processor system 705 that includes one or more processor(s) (aka a "hardware processing unit") and a storage system 710.

Regarding the processor(s) of the processor system 705, it will be appreciated that the functionality described herein can be performed, at least in part, by one or more hardware logic components. For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 700. The different components, modules, engines, and services described herein may be implemented as objects or processors that execute on computer system 700 (e.g. as separate threads).

Storage system 710 may include physical system memory, which may be volatile, non-volatile, or some combination of the two. The term "memory" may also be used herein to refer to non-volatile mass storage such as physical storage media. If computer system 700 is distributed, the processing, memory, and/or storage capability may be distributed as well.

Storage system 710 is shown as including executable instructions 715. The executable instructions 715 represent instructions that are executable by the processor(s) of processor system 705 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 700 may also be connected (via a wired or wireless connection) to external sensors (e.g., one or more remote cameras) or devices via a network 720. For example, computer system 700 can communicate with any number devices or cloud services to obtain or process data. In some cases, network 720 may itself be a cloud network. Furthermore, computer system 700 may also be connected through one or more wired or wireless networks to remote/separate computer systems(s) that are configured to perform any of the processing described with regard to computer system 700.

A "network," like network 720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 700 will include one or more communication channels that are used to communicate with the network 720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for prompting a large language model (LLM) to generate modified code to fix code that uses a deprecated application programming interface (API), said method comprising:
    accessing a corpus of release notes for a set of libraries, wherein the release notes include information describing deprecated or removed APIs associated with the set of libraries;
    storing the corpus of release notes in a vector database;
    accessing a code snippet, which is identified as using the deprecated API;
    using the code snippet to identify a set of release notes from the vector database, wherein the identified set of release notes is determined to satisfy a threshold level of similarity with the code snippet;
    building an LLM prompt that will be fed to the LLM, wherein the LLM prompt instructs the LLM to update the code snippet based on the identified set of release notes; and
    displaying output of the LLM based on the LLM operating in response to the LLM prompt, wherein the output includes a proposed modified version of the code snippet.

2. The method of claim 1, wherein the vector database is indexed using embeddings.

3. The method of claim 1, wherein the vector database further includes information obtained from one or more external sources.

4. The method of claim 3, wherein the one or more external sources include an online forum comprising information describing the identified set of release notes.

5. The method of claim 1, wherein the threshold level of similarity is based on a comparison of embeddings.

6. The method of claim 1, wherein the LLM is a generative pre-trained transformer type of LLM.

7. The method of claim 1, wherein the identified set of release notes includes a code mapping detailing how to map an older version of code to a current, up-to-date version of code.

8. The method of claim 1, wherein the identified set of release notes includes natural language detailing how an older version of code is transformable to a current, up-to-date version of code.

9. The method of claim 1, wherein the identified set of release notes includes a combination of natural language and code.

10. The method of claim 1, wherein the identified set of release notes includes information on how to update an older version of code to a current, up-to-date version of code.

11. A computer system comprising: a processor system; and
    a storage system that includes instructions that are executable by the processor system to cause the computer system to:
    access a corpus of release notes for a set of libraries, wherein the release notes include information describing deprecated or removed application programming interfaces (APIs) associated with the set of libraries;
    store the corpus of release notes in a vector database;
    access a code snippet, which is identified as using a deprecated API;
    use the code snippet to identify a set of release notes from the vector database, wherein the identified set of release notes is determined to satisfy a threshold level of similarity with the code snippet;
    build a large language model (LLM) prompt that will be fed to the LLM, wherein the LLM prompt instructs the LLM to update the code snippet based on the identified set of release notes; and
    display output of the LLM based on the LLM operating in response to the LLM prompt, wherein the output includes a proposed modified version of the code snippet.

12. The computer system of claim 11, wherein the output further includes a selectable option to accept or reject the output.

13. The computer system of claim 11, wherein the proposed modified version of the code snippet is automatically incorporated into a codebase such that the proposed modified version of the code snippet replaces the code snippet in the codebase.

14. The computer system of claim 11, wherein the output is displayed proximately to the code snippet.

15. The computer system of claim 11, wherein the LLM reads the identified set of release notes and translates the identified set of release notes into corresponding code changes.

16. The computer system of claim 11, wherein the vector database is further supplemented with information obtained from sources other than release notes.

17. The computer system of claim 11, wherein the output further includes a rationale associated with the proposed modified version of the code snippet.

18. A method for prompting a large language model (LLM) to generate modified code to fix code that uses a deprecated application programming interface (API), said method comprising:
- accessing a corpus of release notes for a set of libraries, wherein the release notes include information describing deprecated or removed APIs associated with the set of libraries;
- storing the corpus of release notes in a vector database, which is indexed using embeddings;
- accessing a code snippet, which is identified as using the deprecated API;
- using the code snippet to identify a set of release notes from the vector database, wherein the identified set of release notes is determined to satisfy a threshold level of similarity with the code snippet;
- building an LLM prompt that will be fed to the LLM, wherein the LLM prompt instructs the LLM to update the code snippet based on the identified set of release notes; and
- displaying output of the LLM based on the LLM operating in response to the LLM prompt, wherein the output includes a proposed modified version of the code snippet, and wherein the output further includes a rationale associated with the proposed modified version of the code snippet.

19. The method of claim 18, wherein the output further includes a rationale associated with the proposed modified version of the code snippet.

20. The method of claim 18, wherein the LLM prompt includes at least one of an example code mapping, a release note comment, or an instruction for the LLM to provide a rationale regarding its output.

* * * * *